United States Patent [19]

Taylor et al.

[11] Patent Number: 4,682,432

[45] Date of Patent: Jul. 28, 1987

[54] SELF-SUPPORTING ELEMENT FOR MOSAIC DISPLAY PANEL

[75] Inventors: Frank S. Taylor, St-Eustache; Claude Bourdon, Boisbriand, both of Canada

[73] Assignee: Monitronik Ltee, Boisbriand, Canada

[21] Appl. No.: 749,645

[22] Filed: Jun. 28, 1985

[51] Int. Cl.⁴ ............................................. G09F 13/04
[52] U.S. Cl. ........................................ 40/573; 40/452; 40/585
[58] Field of Search .................... 40/542, 546, 489; 40/573, 452, 485

[56] References Cited

U.S. PATENT DOCUMENTS

| | | | |
|---|---|---|---|
| 2,169,022 | 8/1939 | Chubb | 40/434 X |
| 2,300,447 | 11/1942 | Glukes | 40/541 X |
| 2,597,584 | 5/1952 | Hopkins | 40/541 X |
| 3,362,093 | 1/1968 | Joselevich | 40/452 |
| 3,379,869 | 4/1968 | Dorman | 40/541 X |
| 3,389,248 | 6/1968 | Abrams | 40/541 X |
| 3,425,146 | 2/1969 | Winstanley | 40/541 X |
| 3,514,882 | 6/1970 | Avery | 40/546 |
| 3,608,222 | 9/1971 | Koch | 40/452 |
| 3,790,772 | 2/1974 | Newman | 40/541 X |
| 3,868,501 | 2/1975 | Borbour | 40/541 X |
| 3,997,991 | 12/1976 | Hayman-Chaffey | 40/541 X |
| 4,005,538 | 2/1977 | Tung | 40/541 X |
| 4,141,161 | 2/1979 | Hiscock et al. | 40/452 |
| 4,419,838 | 12/1983 | Taylor et al. | 40/489 |
| 4,505,061 | 3/1985 | Neuburger et al. | 40/489 |

Primary Examiner—Gene Mancene
Assistant Examiner—Wenceslao I. Contreras
Attorney, Agent, or Firm—Cushman, Darby & Cushman

[57] ABSTRACT

A light assembly for mounting to a synoptic display panel is composed of a tile having a transparent surface portion, of a light-conducting transparent body, having at one end thereof adjacent to the tile, a diffusion surface, of a hollow block with baffles dividing the block into chambers in which are disposed light elements, and of a transparent plate mounted between the baffles housing and the transparent body; the transparent plate displays a geometrical pattern of colored areas, each area corresponding in shape to the cross-sectional area of a chamber with which it is in registry so that the light emitted from one of the light elements is colored by the area registered therewith, transmitted through the light-conducting body to the diffusion surface and emerges from the transparent surface portion of the tile.

22 Claims, 11 Drawing Figures

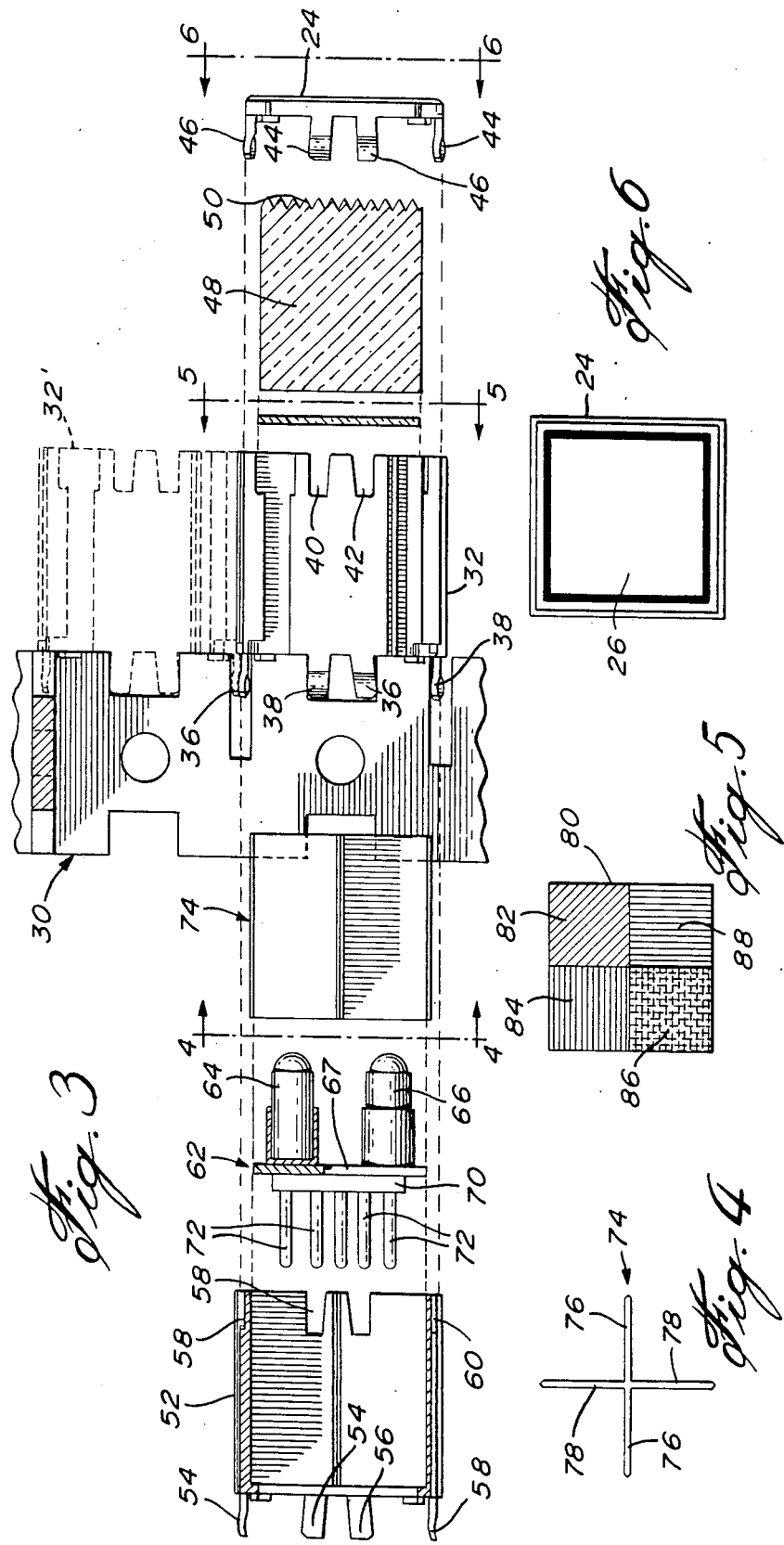

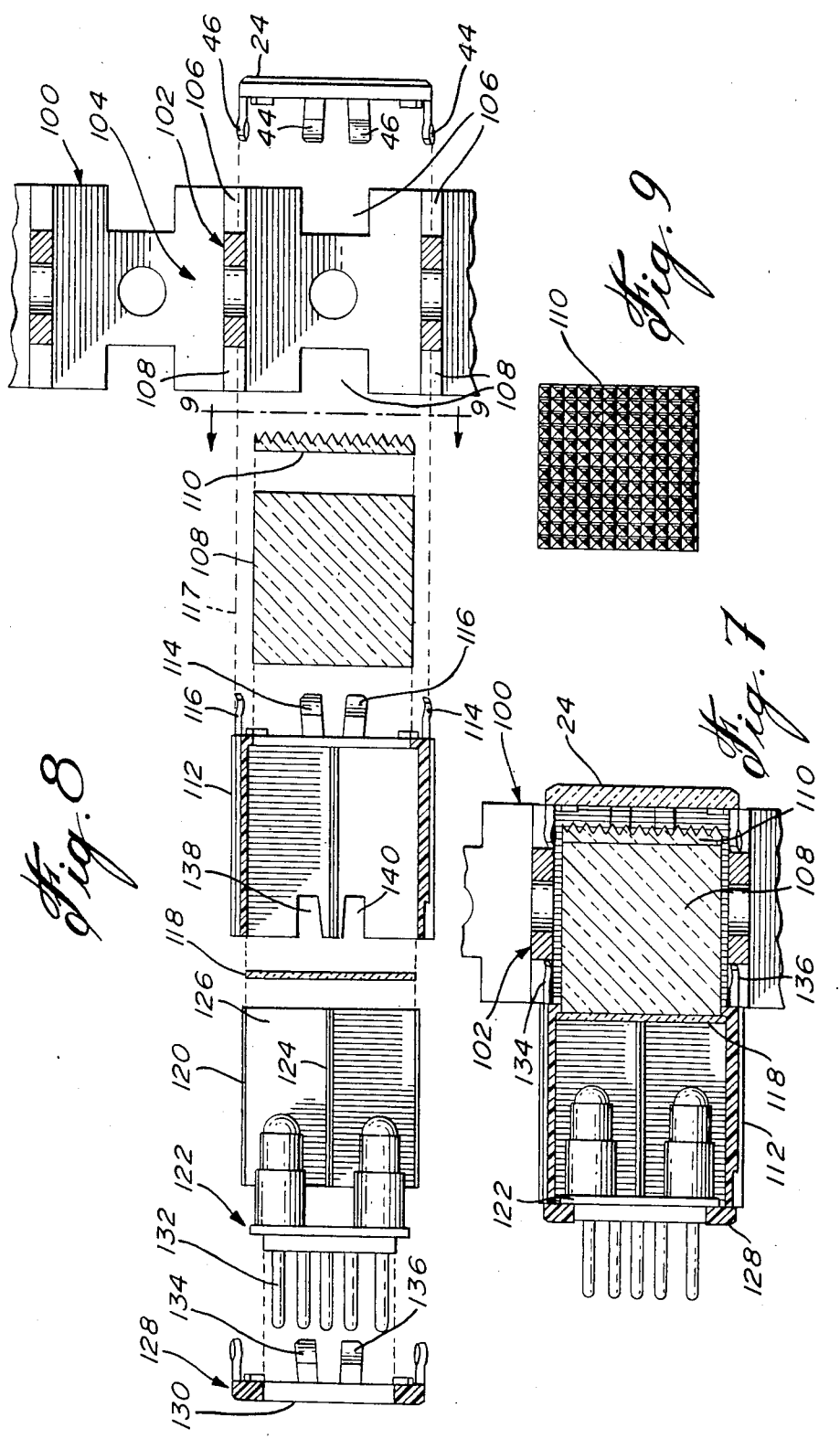

SELF-SUPPORTING ELEMENT FOR MOSAIC DISPLAY PANEL

FIELD OF THE INVENTION

The present invention pertains, generally, to mosaic display panels such as used, for example, as control panels in electric power distribution systems; more particularly, the present invention pertains to a light assembly for mounting to a synoptic panel formed of a plurality of tiles defining a mosaic where one or more of the tiles can produce various colored light effects.

BACKGROUND OF THE INVENTION

Synoptic mosaic panels which are found in power stations, for example, are formed of a series of horizontal and vertical supports to which are mounted control instruments, such as switches, the surface of indicating instruments, such as pilot lamps as well as tiles, the surface of which is either blank or displays indicia representing circuitry or other useful information to the operator. In some panels, certain tiles have a transparent surface portion allowing light to be in order to transmitted from a light source mounted to the panel supports to draw the operator's attention.

OBJECTS AND STATEMENTS OF THE INVENTION

It is an object of the present invention to improve the signalling feature of such panels by providing a light assembly which allows one tile to display more than one information. This is achieved by providing a compact assembly where more than one light source is used for each tile so as to provide more than one light effect for such tile.

The present invention may be used with various constructions of synoptic display panels.

In one construction, the display panel is formed of an arrangement of vertical and horizontal rails and of an arrangement of interengaged selfsupporting hollow blocks (such as described, for example in Canadian Pat. No. 1 126 023 issued to Applicant on June 22, 1982). The light assembly of the present invention for such construction comprises:

(a) a tile adapted to be mounted to one end of the hollow blocks;
(b) light-conducting means received in the one hollow block extending from one end to an opposite end thereof;
(c) light-diffusion means at the one end of the light-conducting means;
(d) a second hollow block adapted to be mounted rearwardly the hollow block at the opposite thereof;
(e) baffle means in the second hollow block dividing the block in two or more chambers;
(f) a light coloring means at the opposite end of the light-conducting means displaying a geometrical pattern of colored areas, each area corresponding in shape to the cross-sectional area of a chamber disposed in registry therewith; and
(g) light source means in each chamber whereby light emitted from one of the source means is colored by the registered area of the light coloring means associated therewith, transmitted through the light-conducting means to the diffusion means, and emerges through the transparent surface portion of the tile.

In another construction, the synoptic mosaic panel is formed of an arrangement of vertical and horizontal rails which, themselves, define a structural housing. With this type of construction, the light assembly of the present invention comprises:

(a) a tile adapted to be mounted to one end of the housings;
(b) light-conducting means adapted to be received in the one housing extending from the one end to the opposite end thereof;
(c) light-diffusion means at the one end of the light-conducting means;
(d) a hollow block adapted to be mounted at the opposite end of the housing;
(e) baffle means in the block dividing the block in two or more chambers;
(f) light coloring means at the opposite end of the light-conducting means displaying a geometrical pattern of colored areas, each area corresponding in shape to the cross-sectional area of an associated chamber disposed in registry therewith; and
(g) light source means in each chamber whereby light emitted from one of the source means is colored by a registered area of the light coloring means associated therewith, transmitted through the light-conducting means to the diffusion means, and emerges through the transparent surface portion of the tile.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

For a better understanding of the present invention, reference is had to the following description taken in connection with the accompanying drawings in which like reference numeral refer to like parts throughout the several views and wherein:

FIG. 3 is an explosive side view, in section, showing the parts of the assembly illustrated in FIG. 2;

FIG. 4 is an end view of the baffle means as seen from lines 4—4 of FIG. 3;

FIG. 5 is an end view of the transparent plate as seen from lines 5—5 of FIG. 3;

FIG. 6 is an end view of the tile as seen from lines 6—6 of FIG. 3;

FIG. 7 is a cross-sectional view of a light assembly illustrating another embodiment of the present invention;

FIG. 8 is an explosive side view, in section, showing the parts forming the light assembly of FIG. 7;

FIG. 9 is an end view of the diffusion plate as seen from lines 9—9 of FIG. 8;

DESCRIPTION OF PREFERRED EMBODIMENTS

Figure 1:
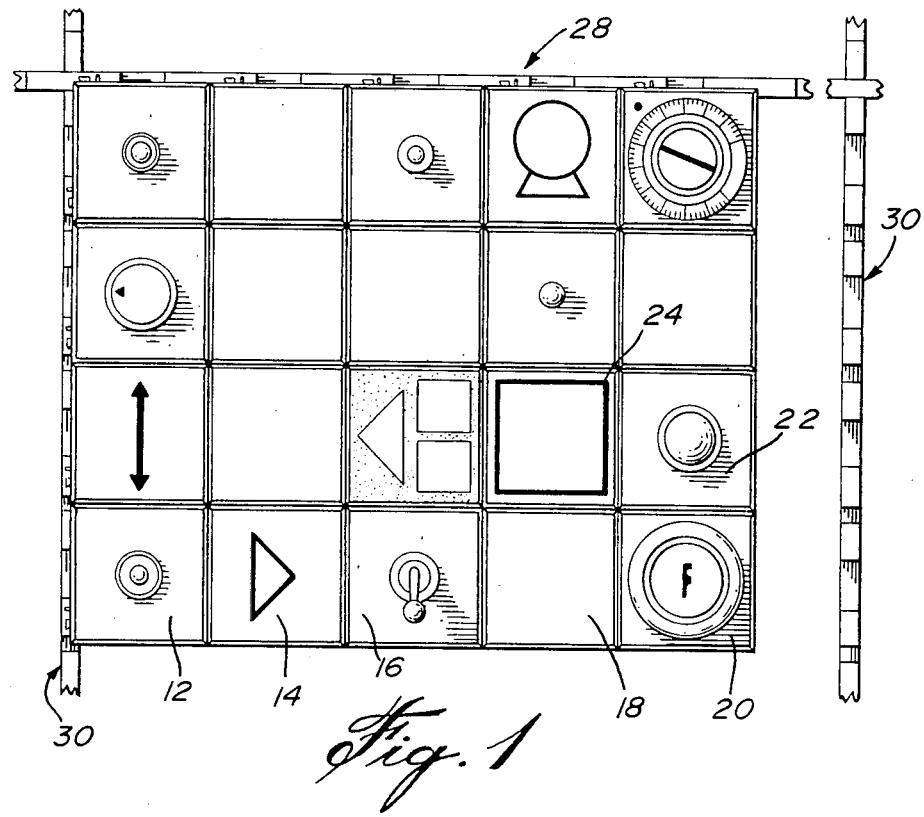
FIG. 1 is a front elevation environmental view showing part of a synoptic mosaic panel structure.

Referring to FIG. 1, there is shown some of the components making up a synoptic mosaic panel structure such as found, for example, in a power processing station. Such panel consists mainly of a front face formed of series of tiles (seven being shown as 12,14,16,18,20,22, and 24) which may have a blank surface such as tile 18, displays a symbol, such as tile 14, carry light bulbs, such as tiles 12 and 22, or a lock, such as tile 20, or a switch, such as tile 16.

The present invention is concerned with the type of tiles shown at 14 and 24 which display a surface portion 25, 26 which is transparent to allow light to be emitted therefrom. More particularly, the present invention consists in allowing the transparent portion 25 or 26 of tile 14 or 24 to have more than one color effect, thus providing to the operator at the display panel, more than one information regarding that tile.

Figure 2:
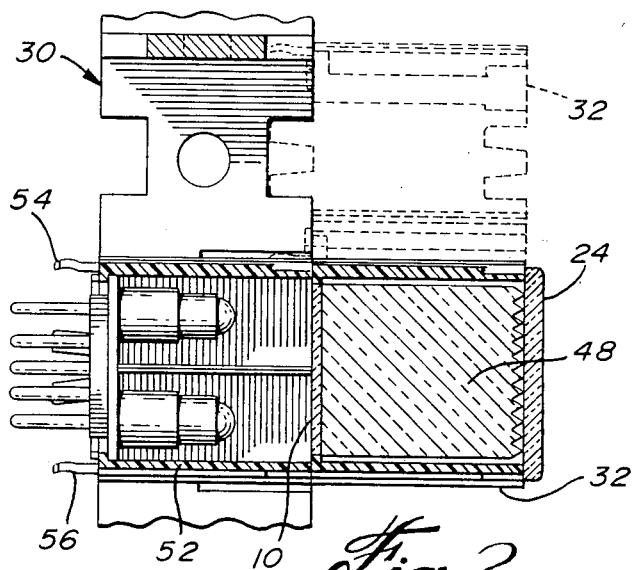
FIG. 2 is a cross-sectional view of a light assembly illustrating one embodiment of the invention for mounting to the construction illustrated in FIG. 1.

Referring also to FIGS. 2 and 3, a first embodiment of the present invention will now be described in association with a display panel which is formed of a plurality of horizontal rails (one being shown as 28) and vertical rails (two being shown as 30). In this embodiment, each tile is mounted to a self-supporting hollow block 32 having four side walls of identical construction, the latter being such that each block is interconnected to an associated similarly constructed block 32' to form a compact arrangement which is supported, at appropriate locations, to the rails 28 and 30. One example of such block may be found described in the above-referred Canadian Pat. No. 1 126 023 issued June 22, 1982 or in U.S. Pat. No. 4,419,838 issued Dec. 13, 1983 also to Applicant. Each side wall of the rectangular hollow block has, at one end thereof, a pair of depending legs 36 and 38 and, at the opposite end thereof a pair of recesses 40 and 42 which are shaped to engagedly receive therein the depending legs 44 and 46 that extend from each side wall of the tile 24.

A rectangular body of transparent light-conductive material 48 is received within the hollow block 32. One end surface 50 of this body is modified to define diffusing surfaces for light conducted through the body.

A second hollow block 52 having a construction identical to block 32 with depending legs 54 and 56 and recesses 58 and 60 on each side wall is rearwardly mounted to block 32. The inter-engagement of these blocks is effected by the depending legs 36 and 38 of block 32 engagedly received in the corresponding recesses 58 and 60 of block 52.

Light source means, generally denoted 62, are mounted in block 52 and include two or more light elements (two being shown as 64 and 66) appropriately mounted to a base 67 equipped with a series of connectors 72.

A cross-shaped member 74 consisting of horizontal baffles 76 and vertical baffles 78 (see FIG. 4) divides the hollow portion of block 52 into a series of chambers in which are received the light elements.

A transparent plate 80 is disposed between the transparent body 48 and the rear block 52. The plate displays a geometrical pattern of colored areas 82,84,86 and 88, each area having a shape which corresponds to the cross-sectional shape of a chamber. In the example illustrated, each chamber has a square cross-section which corresponds to the cross-section of a colored area associated therewith.

Referring to FIGS. 7 and 8, there is shown another embodiment of the present invention where the synoptic display panel is formed of series of horizontal and vertical rails 100 and 102 together defining a plurality of rectangular openings 104. The rails are structured so that for each opening, there is provided four side walls, each having opposite recesses 106 and 108. Tile 24 is identical in construction to the tile described above in connection with FIGS. 2 and 3. With this construction of panels, the depending legs 44 and 46 on each side of the tile are engagedly received in the corresponding recesses 106 of the housing side walls.

A light-conducting transparent body 108 is disposed in housing 104; this body may be structured identically to the body 48 shown in FIG. 3 or, alternatively, the end surface may be plane and a separate diffusion plate 110 may be used between the body and the tile.

The light assembly of this second embodiment includes a hollow block 112 which is substantially identical in construction to blocks 32 and 52 described above. Each side wall of block 112 has a pair of depending legs 114 and 116 which are adapted to be engaged in the recesses 108 of each side wall of the housing 104 as indicated by the dotted lines 117 in FIG. 8. Received within the hollow portion of the block 112 is a transparent plate 118 which may be identical to plate 80 described above or have any other colored configuration as is required. Also received within the hollow portion of block 112 is a baffle member 120 which will have a construction corresponding to the dividing lines of the colored areas on plate 118.

The light source means 122 is similar in construction to that of the source means 62 of FIG. 3 and is such that each light element is received within the chambers formed by the baffles 124 and 126. In the present embodiment, the assembly may be completed with a cap 128 having an opening 130 allowing passage of the connectors 132 therethrough. The cap, which has a structure similar to that of tile 24, is provided with legs 134 and 136 which engage recesses 138 and 140 of each side wall of block 112.

Figure 10:
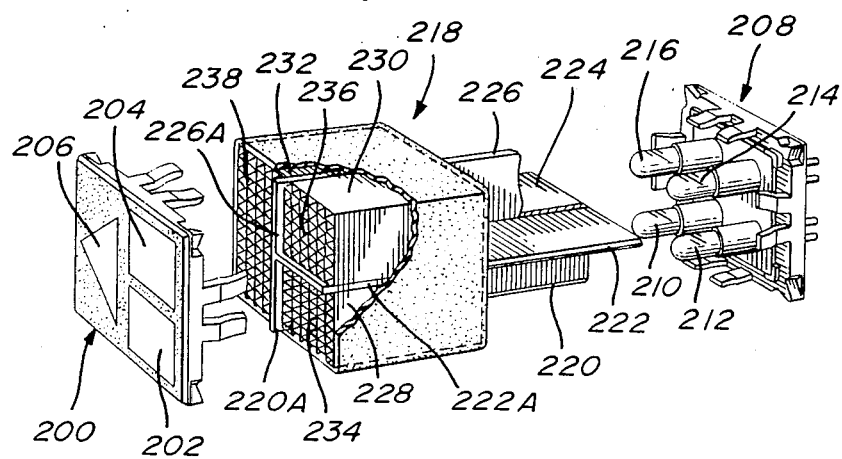
FIG. 10 is a perspective view, with certain parts broken, of another embodiment of the present invention.
Figure 11:
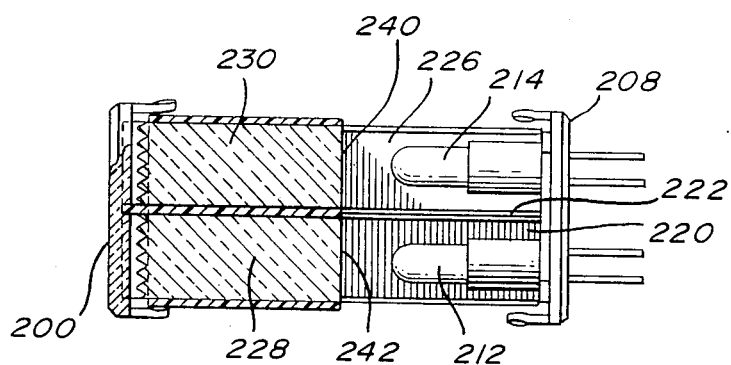
FIG. 11 is an elevational cross-section view of the embodiment illustrated in FIG. 10.

Referring to FIGS. 10 and 11, another embodiment illustrating a light assembly made in accordance with the present invention is shown. It includes a tile 200, of similar construction to tile 24 having three transparent portions 202, 204 and 206, and a light source 208 with four light elements 210, 212, 214 and 216. The center member, generally denoted 218, includes a cross-shaped baffle member consisting of four walls 220, 222, 224 and 226 separating the light elements. The light conducting means in this embodiment consists of three transparent rectangular bodies 228, 230 and 232. Hence, the baffle member in the light conducting area has three extension walls 220A, 222A and 226A. The transparent bodies have, at one end thereof, adjacent to the tile, a diffusion surface 234, 236 and 238, respectively. At the opposite end of the bodies, there are four color-painted areas (two being shown as 240 and 242 in FIG. 11) which are defined by the four walls 220, 222, 224 and 226 which either terminate at that end or extend through the light conducting means. To secure the bodies together, as well as to prevent light emission to similar adjacent light assemblies in the panel, a band of heat shrinkable opaque material is positioned to envelop central member 218. This embodiment is simpler in construction than those described above in that a transparent coloring plate and a light diffuser plate are not utilized. This assembly allows two colored signals to appear on surface 206 while only one may be seen on respective surfaces 202 and 204.

Although the invention has been described in relation to three specific forms, it will be evident that it may be refined and modified in various ways. For example, the four side walls of the rectangular body, in single or combined arrangement, may be coated with paint (preferably, while) to facilitate light conduction through the bodies. It is, therefore, wished to have it understood that this invention should not be limited in interpretation, except by the terms of the following claims.

The embodiments of the invention in which an exclusive property or privilege is claimed are defined as follows:

1. A light assembly for mounting to a synoptic mosaic panel structure formed of an arrangement of vertical and horizontal rails and of an arrangement of inter-engaged self-supporting hollow blocks, said block arrangement being mounted to said rail arrangement, said assembly comprising:
   (a) a tile adapted to be mounted to one end of one of said hollow blocks, said tile having at least one transparent surface portion
   (b) light-conducting means received in said one hollow block extending from said one end to an opposite end thereof;
   (c) light-diffusion means at one end of said light-conducting means;
   (d) a second hollow block adapted to be mounted rearwardly of said one hollow block at said opposite end thereof;
   (e) baffle means in said second hollow block dividing said block in two or more chambers;
   (f) light coloring means at the opposite end of said light-conducting means, displaying a geometrical pattern of colored areas, each area corresponding in shape to the cross-sectional area of an associated chamber disposed in registry therewith; and
   (g) light source means in each said chamber whereby light emitted from one of said source means is colored by the registered area of said light coloring means associated therewith, transmitted through said light-conducting means to said diffusion means, and emerges through said transparent surface portion of said tile.

2. A light assembly as defined in claim 1, wherein said light-conducting means is a body of transparent material.

3. A light assembly as defined in claim 2, wherein said light-diffusion means consist of a series of diffusing surfaces covering one end wall of said body adjacent to said tile.

4. A light assembly as defined in claim 2, wherein said light-diffusion means consist of a plate with diffusing surfaces thereon disposed between said body and said tile.

5. A light assembly as defined in claim 1, wherein each of said first and second hollow blocks consists of a body formed of four side walls and having a pair of transversely spaced depending legs projecting from each side all at one end thereof; said body displaying, at the opposite end of each side wall, a pair of recesses; said tile defining a body displaying, at each side wall thereof, a pair of transversely spaced depending legs adapted to be received in the recesses of said first hollow block; said legs of said first hollow block being adapted to be received in the recesses of the rearwardly hollow block.

6. A light assembly as defined in claim 1 wherein said light-coloring means consists of a transparent plate mounted between said one and said second hollow blocks.

7. A light assembly as defined in claim 1 wherein said light-coloring means consists of colored areas painted directly on said light-conducting means at said opposite end thereof.

8. A light assembly as defined in claim 2 wherein said baffle means consist of dividing walls, at least one of said walls extending further through said light coloring means and said light conducting means thereby dividing said body into a plurality of smaller bodies corresponding in number and in cross-sectional shape to said colored areas.

9. A light assembly as defined in claim 8, wherein said baffle means terminate in grooves in said tile.

10. A light assembly as defined in claim 2, wherein the four side walls of said body adjacent said block are painted to prevent light emission to adjacent light assemblies.

11. A light assembly as defined in claim 2 wherein a band of opaque heat shrinkable material covers the four parallel side walls of said body.

12. A light assembly for mounting to a synoptic mosaic panel structure formed of an arrangement of vertical and horizontal rails defining structural housings; said assembly comprising:
   (a) a tile adapted to be mounted to one end of one of said housings, said tile having at least one transparent surface portion;
   (b) light-conducting means adapted to be received in said one housing extending from said one end to an opposite end thereof;
   (c) light-diffusion means at one end of said light-conducting means;
   (d) a hollow block adapted to be mounted at said opposite end of said housing;
   (e) baffle means in said block dividing said block in two or more chambers;
   (f) light coloring means at the opposite end of said light-conducting means, displaying a geometrical pattern of colored areas, each area corresponding in shape to the cross-sectional area of an associated chamber disposed in registry therewith;
   (g) light source means in each said chamber whereby light emitted from one of said source means is colored by the registered area of said light coloring means associated therewith, transmitted through said light-conducting means to said diffusion means and emerges through said transparent surface portion of said tile.

13. A light assembly as defined in claim 12, wherein said light-coloring means is a body of transparent material.

14. A light assembly as defined in claim 13, wherein said light-diffusion means consist of a series of diffusing surfaces covering one end wall of said body of transparent material.

15. A light assembly as defined in claim 13, wherein said light-diffusion means consist of a plate with diffusing surfaces thereon disposed between said transparent body and said tile.

16. A light assembly as defined in claim 12, wherein said tile has a predetermined shape with a pair of depending legs extending from each side wall thereof and adapted to be engaged in associated recesses in said horizontal and vertical rails; said hollow block defining a body formed of four side walls and displaying, at one end thereof, a pair of depending legs extending from each side wall thereof; said legs being adapted to be received in associated recesses in said vertical and horizontal rails.

17. A light assembly as defined in claim 12 wherein said light-coloring means consists of a transparent plate mounted between said one and said second hollow blocks.

18. A light assembly as defined in claim 12 wherein said light-coloring means consists of colored areas painted directly on said light conducting means at said opposite end thereof.

19. A light assembly as defined in claim 13 wherein said baffle means consist of dividing walls, at least one of said walls extending further through said light coloring means and said light-conducting means thereby dividing said body into a plurality of smaller bodies corresponding in number and in cross-sectional shape to said colored areas.

20. A light assembly as defined in claim 19, wherein said baffle means terminate in grooves in said tile.

21. A light assembly as defined in claim 13, wherein the four side walls of said body adjacent said block are painted to prevent light emission to adjacent light assemblies.

22. A light assembly as defined in claim 13 wherein a band of opaque heat shrinkable material covers the four parallel side walls of said body.

* * * * *